(12) United States Patent
Kim

(10) Patent No.: US 12,011,974 B2
(45) Date of Patent: Jun. 18, 2024

(54) GAS INJECTION TYPE HEAT MANAGEMENT SYSTEM FOR VEHICLE

(71) Applicants: Hyundai Motor Company, Seoul (KR); Kia Corporation, Seoul (KR)

(72) Inventor: Jong Won Kim, Cheonan-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 71 days.

(21) Appl. No.: 17/742,490

(22) Filed: May 12, 2022

(65) Prior Publication Data

US 2023/0124465 A1    Apr. 20, 2023

(30) Foreign Application Priority Data

Oct. 19, 2021    (KR) .................. 10-2021-0139434

(51) Int. Cl.
*B60H 1/00*    (2006.01)
*B60H 1/32*    (2006.01)

(52) U.S. Cl.
CPC ..... *B60H 1/00899* (2013.01); *B60H 1/00271* (2013.01); *B60H 1/00485* (2013.01); *B60H 1/00921* (2013.01); *B60H 1/3213* (2013.01); *B60H 1/3228* (2019.05); *B60H 1/00392* (2013.01); *B60H 2001/00949* (2013.01); *B60H 2001/00957* (2013.01); *B60H 2001/3291* (2013.01)

(58) Field of Classification Search
CPC ............ B60H 1/00899; B60H 1/00271; B60H 1/00485; B60H 1/00921; B60H 1/3213; B60H 1/3228; B60H 1/00392; B60H 2001/00949; B60H 2001/00957; B60H 2001/3291; B60H 2001/3279; B60H 2001/3285; F25B 2400/054; F25B 2400/13

See application file for complete search history.

(56) References Cited

U.S. PATENT DOCUMENTS 5,174,123 A * 12/1992 Erickson ................. F25B 1/047
                                              62/278
8,336,319 B2 * 12/2012 Johnston ............... B60K 11/04
                                              62/434

(Continued)

FOREIGN PATENT DOCUMENTS

EP    2392486 B1 *  4/2018    .............. B60H 1/00

*Primary Examiner* — Ljiljana V. Ciric
(74) *Attorney, Agent, or Firm* — Slater Matsil, LLP

(57) ABSTRACT

A gas injection-type heat management system includes a first refrigerant line along which a compressor, an inner condenser, a first expansion valve, and a flash tank are sequentially provided and through which a refrigerant flows, a second refrigerant line along which a second expansion valve and an evaporator are sequentially provided and the refrigerant flows from the flash tank and circulates to the compressor via the second expansion valve and the evaporator, a third refrigerant line configured such that the refrigerant discharged from the flash tank flows directly to the compressor and a heat absorber for performing heat exchange between the refrigerant discharged from the inner condenser and the refrigerant discharged from the flash tank, and a controller for controlling whether to operate the compressor, whether to allow the refrigerant to flow and whether to expand the refrigerant.

15 Claims, 7 Drawing Sheets

(56) References Cited

U.S. PATENT DOCUMENTS

| | | | | |
|---|---|---|---|---|
| 9,511,645 B2* | 12/2016 | Johnston | ............ | B60H 1/32284 |
| 9,731,576 B2* | 8/2017 | Johnston | ............ | B60H 1/00921 |
| 9,758,010 B2* | 9/2017 | Johnston | ............ | B60H 1/00385 |
| 11,318,816 B2* | 5/2022 | Kim | .................. | B60H 1/32281 |
| 11,807,067 B2* | 11/2023 | Mancini | ............. | B60H 1/00278 |
| 2012/0103005 A1* | 5/2012 | Kopko | ................... | F25B 1/047 |
| | | | | 62/430 |
| 2016/0107502 A1* | 4/2016 | Johnston | ............ | B60H 1/00921 |
| | | | | 165/202 |
| 2016/0107503 A1* | 4/2016 | Johnston | ............ | B60H 1/00278 |
| | | | | 165/202 |
| 2016/0107504 A1* | 4/2016 | Johnston | ............ | B60H 1/32284 |
| | | | | 165/202 |
| 2016/0107505 A1* | 4/2016 | Johnston | ............ | B60H 1/00278 |
| | | | | 165/202 |
| 2019/0070924 A1* | 3/2019 | Mancini | ............. | B60H 1/00564 |
| 2021/0331554 A1* | 10/2021 | Mancini | ................... | B60H 1/26 |

* cited by examiner

GAS INJECTION TYPE HEAT MANAGEMENT SYSTEM FOR VEHICLE

CROSS-REFERENCE TO RELATED APPLICATIONS

This application claims the benefit of Korean Patent Application No. 10-2021-0139434, filed on Oct. 19, 2021, which application is hereby incorporated herein by reference.

TECHNICAL FIELD

The present invention relates to a gas injection type heat management system for a vehicle.

BACKGROUND

Recently, environmentally-friendly vehicles such as electric vehicles have come into wide use to solve environmental issues caused by internal combustion engine vehicles. In the case of the internal combustion engine vehicle in the related art, waste heat from an engine may be used to heat the interior, which does not require energy for a separate heating process. However, because the electric vehicle has no engine, i.e., a heat source, separate energy is required to perform the heating process, which causes a deterioration in fuel economy. Further, the deterioration in fuel economy decreases a travelable distance of the electric vehicle and causes the vehicle to need to be frequently charged, which causes discomfort.

Meanwhile, as the vehicle is motorized, there is an additional need to manage not only heat in the interior of the vehicle, but also heat of electrical components such as a high-voltage battery and a motor. That is, in the case of the electric vehicle, the interior space, the battery, and the electrical components have different needs for air conditioning, and thus there is required a technology capable of maximally saving energy by independently coping with and efficiently and cooperatively managing the different needs. Therefore, an integrated vehicle heat management concept has been proposed in order to improve thermal efficiency by independently managing heat of the respective components and integrating the heat management of the entire vehicle.

In order to perform the integrated vehicle heat management, complicated coolant lines and components need to be integrated and modularized. To this end, there is required a modularization concept capable of modularizing the plurality of components, simply manufacturing the components, and implementing the compact package.

Meanwhile, recently, studies are being actively conducted to improve efficiency of a heat pump of the electric vehicle.

One of the methods of improving the efficiency of the heat pump is the use of a gas injection type heat pump.

The gas injection type heat pump uses a heat exchanger (H/X) or a flash tank and improves heating efficiency of the vehicle by increasing a flow rate of a refrigerant circulating during a heating process.

Embodiments of the present invention improve utilization of energy consumed by a compressor using heat exchange between refrigerants in a gas injection type heat pump system.

The foregoing explained as the background is intended merely to aid in the understanding of the background of the present invention, and is not intended to mean that the present invention falls within the purview of the related art that is already known to those skilled in the art.

SUMMARY

The present invention relates to a gas injection type heat management system for a vehicle. Particular embodiments relate to a gas injection type heat management system for a vehicle, which is applied with a flash tank capable of reducing the amount of use of a separate heater during an initial heating process by using energy consumed by a compressor during a heating process using heat exchange between circulating refrigerants.

Embodiments of the present invention can solve problems in the art and provide a gas injection type heat management system for a vehicle, which is capable of reducing the amount of use of a separate heater during an initial heating process by using energy consumed by a compressor during a heating process using heat exchange between circulating refrigerants.

Technical problems that may be solved by embodiments of the present invention are not limited to the above-mentioned technical problems, and other technical problems, which are not mentioned above, may be clearly understood from the following descriptions by those skilled in the art to which the present invention pertains.

A gas injection type heat management system for a vehicle according to an embodiment of the present invention includes a first refrigerant line in which a compressor, an inner condenser, a first expansion valve, and a flash tank are sequentially provided and a refrigerant flows, a second refrigerant line in which a second expansion valve and an evaporator are sequentially provided and the refrigerant flows from the flash tank and circulates to the compressor via the second expansion valve and the evaporator, a third refrigerant line in which the refrigerant discharged from the flash tank flows directly to the compressor and a heat absorber for performing heat exchange between the refrigerant discharged from the inner condenser and the refrigerant discharged from the flash tank, and a control unit configured to control whether to operate the compressor and control whether to allow the refrigerant to flow and whether to expand the refrigerant by adjusting opening degrees of the first expansion valve and the second expansion valve.

The gas injection type heat management system may further include a fourth refrigerant line which branches off from the first refrigerant line at a branch point provided at a downstream point of the inner condenser based on a flow direction of the refrigerant, in which the fourth refrigerant line passes through the heat absorber and then merges into the first refrigerant line at a junction between the first expansion valve and a downstream point of the branch point, and a 3-way valve configured to control flows in three directions may be provided at the branch point or the junction.

Heat exchange may be performed in the heat absorber such that the refrigerant discharged from the flash tank absorbs heat from the refrigerant discharged from the inner condenser.

Heat exchange may be performed in the evaporator such that the refrigerant flowing in the second refrigerant line absorbs heat from air circulating in the vehicle.

In a first heating mode, the control unit may circulate the refrigerant flowing to the first refrigerant line to the third refrigerant line, block the flow of the refrigerant to the second refrigerant line, and allow the refrigerant passing through the inner condenser to flow to the heat absorber, such that the refrigerant, which is discharged from the flash tank and introduced into the compressor, absorbs, in the heat absorber, heat from the refrigerant discharged from the inner condenser.

In the first heating mode, the control unit may operate the compressor so that the compressed refrigerant radiates heat while exchanging heat with the air inside the vehicle while passing through the inner condenser, the control unit may allow the refrigerant to flow to the fourth refrigerant line by controlling an operation of opening or closing the 3-way valve so that the refrigerant, which radiates heat while passing through the inner condenser, flows to the heat absorber, the control unit may adjust an opening degree of the first expansion valve so that the refrigerant, which radiates heat while passing through the inner condenser, and the refrigerant, which radiates heat while passing through the heat absorber, are expanded by passing through the first expansion valve and then pass through the flash tank, and the second expansion valve is fully closed to block the flow of the refrigerant to the second refrigerant line.

The first heating mode may be in a state of COP=1 in which the refrigerant flowing in the first refrigerant line, the third refrigerant line, and the fourth refrigerant line does not exchange heat with a separate coolant, and heat exchange is performed between the refrigerant flowing in the third refrigerant line and the refrigerant flowing in the fourth refrigerant line.

In a second heating mode, the control unit may circulate a part of the refrigerant flowing to the first refrigerant line to the second refrigerant line, circulate the remaining part of the refrigerant to the third refrigerant line, and allow the refrigerant passing through the inner condenser to flow to the heat absorber, the refrigerant flowing in the second refrigerant line may absorb, in the evaporator, heat from air circulating in the vehicle, and the refrigerant, which is discharged from the flash tank and introduced into the compressor, may absorb, in the heat absorber, heat from the refrigerant discharged from the inner condenser.

In the second heating mode, the control unit may operate the compressor so that the compressed refrigerant radiates heat while exchanging heat with the air inside the vehicle while passing through the inner condenser, the control unit may allow the refrigerant to flow to the fourth refrigerant line by controlling an operation of opening or closing the 3-way valve so that the refrigerant, which radiates heat while passing through the inner condenser, flows to the heat absorber, the control unit may adjust an opening degree of the first expansion valve so that the refrigerant, which radiates heat while passing through the inner condenser, and the refrigerant, which radiates heat while passing through the heat absorber, are expanded while passing through the first expansion valve and then pass through the flash tank, and the control unit may adjust an opening degree of the second expansion valve so that a part of the refrigerant passing through the flash tank is expanded by passing through the second expansion valve and then passes through the evaporator.

The second heating mode may be a state of COP=1 in which the refrigerant flowing in the first refrigerant line, the second refrigerant line, the third refrigerant line, and the fourth refrigerant line does not exchange heat with a separate coolant, and heat exchange is performed between the refrigerant flowing in the third refrigerant line and the refrigerant flowing in the fourth refrigerant line, and the second heating mode may be a state in which heat exchange is performed between the refrigerant passing through the evaporator and the air circulating in the vehicle.

According to the embodiment of the present invention, the heat exchange between the refrigerant at the downstream point of the inner condenser and the refrigerant at the downstream point of the flash tank raises the temperature of the refrigerant to be introduced into the compressor, which makes it possible to improve the operational efficiency of the compressor.

In addition, the heat absorber is provided to perform the heat exchange between the refrigerants to use the energy consumed by the compressor during the heating process, which makes it possible to implement the heating mode in the state of COP=1 without heat exchange between the refrigerant and a separate coolant.

Therefore, even in the initial heating process, the heating process may be performed by reducing the amount of use of a separate heater or without using the heater, which makes it possible to save energy and omit the configuration of the heater.

DETAILED DESCRIPTION OF ILLUSTRATIVE EMBODIMENTS

Figure 1:
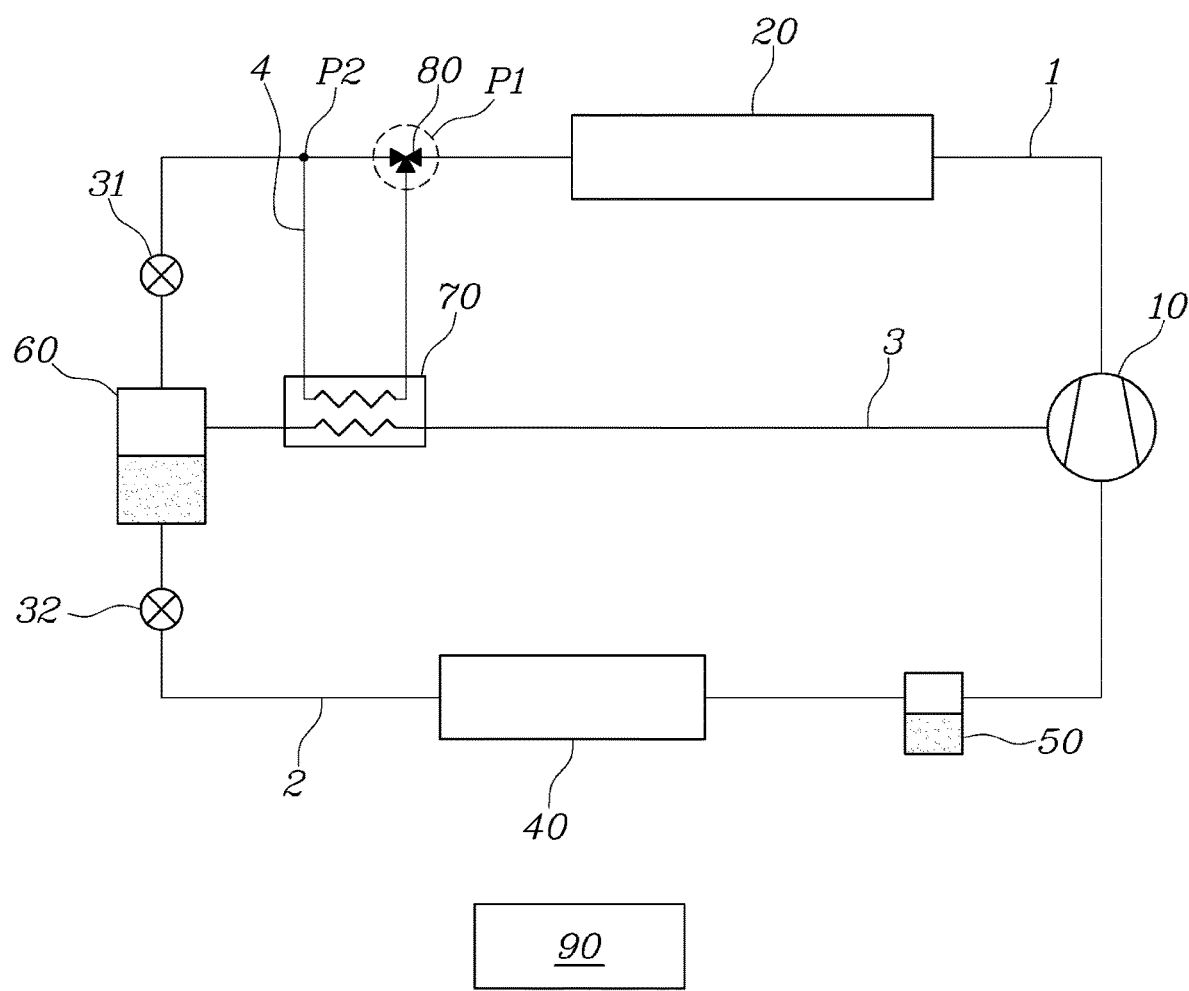
FIG. 1 is a circuit diagram illustrating a gas injection type heat management system for a vehicle according to an embodiment of the present invention.

Hereinafter, embodiments of the present invention will be described in more detail with reference to the accompanying drawings. However, the present invention is not limited to the exemplary embodiments disclosed herein but will be implemented in various forms. The exemplary embodiments of the present invention are provided so that the present invention is completely disclosed, and a person with ordinary skill in the art can fully understand the scope of the present invention. In the drawings, the same reference numerals refer to the same elements.

Meanwhile, unless otherwise specified in the description of the embodiments of the present invention, positions of the respective constituent elements will be described depending on a flow direction of a fluid such as a coolant and a refrigerant. For example, a constituent element, through which the fluid passes relatively first, is understood as being positioned at an upstream point, and a constituent element, through which the fluid passes relatively later, is understood as being positioned at a downstream point.

FIG. 1 is a circuit diagram illustrating a gas injection type heat management system for a vehicle according to an embodiment of the present invention.

As illustrated in FIG. 1, a gas injection type heat management system for a vehicle according to an embodiment of the present invention includes a first refrigerant line 1 in which a compressor 10, an inner condenser 20, a first expansion valve 31, and a flash tank 60 are sequentially provided and through which a refrigerant flows.

Further, the gas injection type heat management system for a vehicle includes a second refrigerant line 2 in which a second expansion valve 32 and an evaporator 40 are sequentially provided, and the refrigerant flows from the flash tank 60 and circulates to the compressor via the second expansion valve 32 and the evaporator 40. In this case, in the second refrigerant line 2, a gas-liquid separator 50 may be further provided at a downstream point of the evaporator 40, i.e., between the evaporator 40 and the compressor 10.

In particular, in the present embodiment, the gas injection type heat management system for a vehicle includes a third refrigerant line 3 in which the refrigerant flowing from the flash tank 60 flows directly to the compressor 10, and a heat absorber 70 is provided to exchange heat between the refrigerant discharged from the inner condenser 20 and the refrigerant discharged from the flash tank 60.

Further, on the first refrigerant line 1, a fourth refrigerant line 4 is provided in which the refrigerant discharged from the inner condenser 20 flows to the heat absorber 70, and the refrigerant passing through the heat absorber 70 merges into the first refrigerant line 1.

The compressor 10 is a means for compressing the refrigerant introduced from the second refrigerant line 2 and the third refrigerant line 3 and converting the refrigerant into a high-pressure refrigerant. In this case, a gas injection type compressor is applied as the compressor 10.

The inner condenser 20 is installed in an interior air conditioning device of the vehicle and exchanges heat between the compressed refrigerant passing through the inner condenser 20 and the air to be supplied to the interior of the vehicle. Further, the inner condenser 20 radiates the heat of the refrigerant into the air to be supplied to the interior of the vehicle, thereby heating the interior of the vehicle.

The first expansion valve 31 and the second expansion valve 32 each serve to block or permit the flow of the refrigerant and adjust an opening degree thereof to expand the refrigerant while the refrigerant flows.

The evaporator 40 exchanges heat between the refrigerant and the air recirculating to the interior space of the vehicle. The evaporator 40 serves to absorb heat from the air recirculating to the interior space of the vehicle and raise a temperature of the refrigerant.

The gas-liquid separator (accumulator) 50 separates a gas-phase refrigerant and a liquid-phase refrigerant contained in the refrigerant and introduces only the gas-phase refrigerant into the compressor 10.

The flash tank 60 expands again the refrigerant expanded by the first expansion valve 31 and separates the gas-phase refrigerant and the liquid-phase refrigerant.

The heat absorber 70 is a heat exchange means that exchanges heat between the refrigerants. In the present embodiment, the heat exchange is performed such that the refrigerant discharged from the flash tank 60 absorbs the heat from the refrigerant discharged from the inner condenser 20.

Meanwhile, the first refrigerant line 1 has a branch point P1 disposed at a downstream point of the inner condenser 20, and the fourth refrigerant line 4 branches off from the first refrigerant line 1 at the branch point P1, such that the refrigerant, which radiates heat while passing through the inner condenser 20, flows to the heat absorber 70 through the fourth refrigerant line 4.

Further, the fourth refrigerant line 4 is connected to a junction P2 disposed between the first expansion valve 31 and a downstream point of the branch point P1 so that the refrigerant, which radiates heat by heat exchange while passing through the heat absorber 70, is introduced back into the downstream point of the branch point P1 on the first refrigerant line 1.

In this case, a 3-way valve 80 for controlling flows in three directions is provided at the branch point P1 or the junction P2. In the present embodiment, the 3-way valve 80 is provided at the branch point P1.

Meanwhile, a control unit 90 is further provided. The control unit controls whether to operate the compressor 10, whether to open or close the first expansion valve 31, and whether to open or close the second expansion valve 32. The control unit controls whether to allow the refrigerant to flow and whether to expand the refrigerant by adjusting the opening degree, and controls whether to open or close the 3-way valve 80.

The gas injection type heat management system for a vehicle according to an embodiment of the present invention configured as described above may implement various modes under the control of the control unit.

Hereinafter, embodiments of various modes implemented by the gas injection type heat management system for a vehicle will be described with reference to the drawings.

Figure 2A:
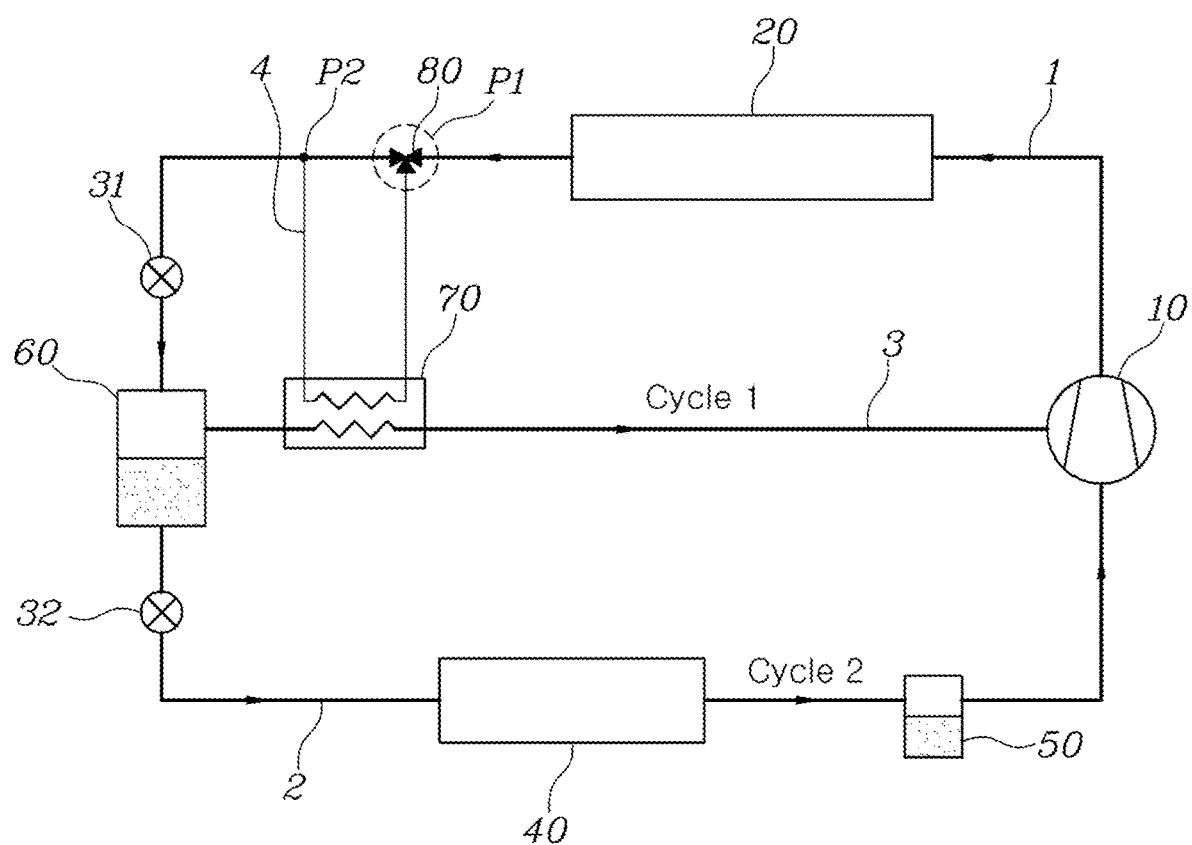
FIG. 2A is a circuit diagram illustrating an operation in a general heating mode in the gas injection type heat management system for a vehicle according to an embodiment of the present invention.
Figure 2B:
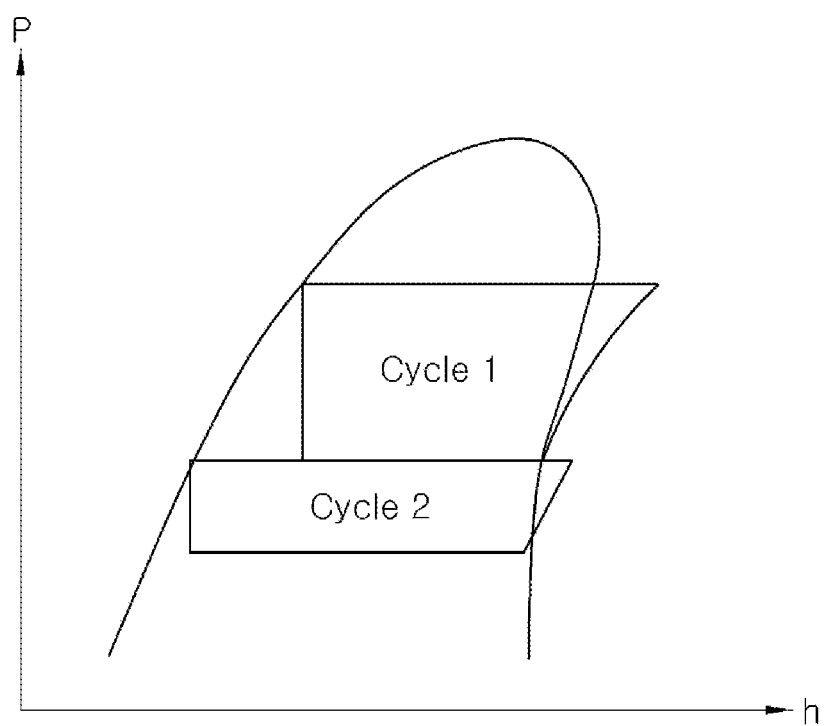
FIG. 2B is a P-h diagram illustrating the operation in the general heating mode in the gas injection type heat management system for a vehicle according to an embodiment of the present invention.

FIG. 2A is a circuit diagram illustrating an operation of a general heating mode in the gas injection type heat management system for a vehicle according to an embodiment of the present invention, and FIG. 2B is a P-h diagram illustrating the general heating mode in the gas injection type heat management system for a vehicle according to an embodiment of the present invention.

As illustrated in FIGS. 2A and 2B, the general heating mode is a heating mode in which the flash tank 60 is used to increase the flow rate of the refrigerant circulating during the heating process without operating the heat absorber 70.

In this case, the refrigerant flows to the first refrigerant line 1, flows along the second refrigerant line 2 and the third refrigerant line 3, and then circulates to the first refrigerant line 1 again.

Therefore, the control unit operates the compressor 10 so that the compressed refrigerant radiates heat while exchanging heat with the air inside the vehicle while passing through the inner condenser 20.

Further, the control unit adjusts the opening degree of the first expansion valve 31 to expand the refrigerant passing through the first expansion valve 31. In addition, like the first expansion valve 31, the opening degree of the second expansion valve 32 may be adjusted to expand the refrigerant passing through the second expansion valve 32 or the second expansion valve 32 may be fully opened to allow the refrigerant to flow without being additionally expanded.

Therefore, the refrigerant compressed by the compressor 10 radiates heat while exchanging heat with the air inside the vehicle while passing through the inner condenser 20, such that the refrigerant is cooled. In this manner, the low-temperature, high-pressure refrigerant is expanded by passing through the first expansion valve 31 and becomes a low-temperature, low-pressure refrigerant. A part of the low-temperature, low-pressure refrigerant is introduced directly into the compressor 10 (Cycle 1).

Further, the remaining part of the low-temperature, low-pressure refrigerant expanded by passing through the first expansion valve 31 passes through the second expansion valve 32 without being changed or is expanded by passing through the second expansion valve 32. Then, the refrigerant passes through the evaporator 40, absorbs heat from the air, circulating in the vehicle, in the evaporator 40, and thus becomes a high-temperature, low-pressure refrigerant. The high-temperature, low-pressure refrigerant, which absorbs heat in the evaporator 40 as described above, passes through the gas-liquid separator 50, such that the liquid-phase refrigerant is separated, and only the gas-phase refrigerant is introduced back into the compressor 10 (Cycle 2).

In this manner, a part of the refrigerant passing through the flash tank 60 is introduced directly into the compressor 10, and the remaining part of the refrigerant absorbs heat while passing through the evaporator 40 and then is introduced into the compressor 10. Therefore, it is possible to increase the flow rate of the refrigerant circulating during the heating process and thus improve the heating efficiency.

Next, first and second heating modes in which the refrigerant flows to the heat absorber so that the heat exchange is performed between the refrigerants will be described.

Figure 3A:
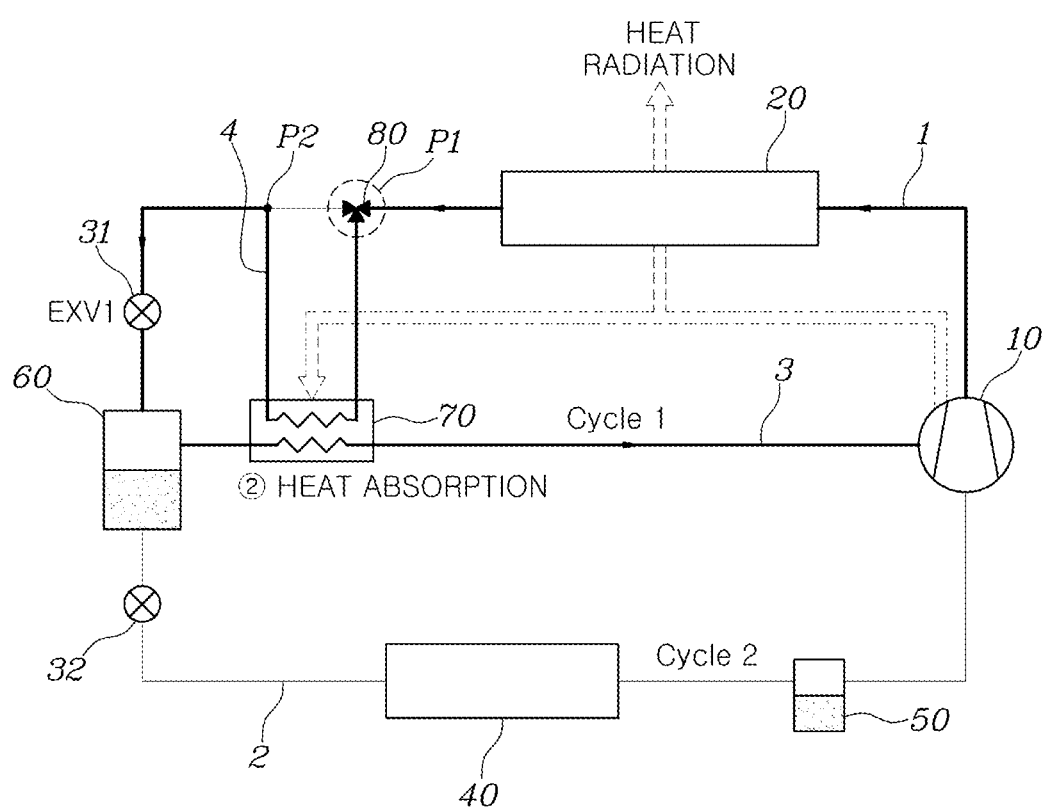
FIG. 3A is a circuit diagram illustrating an operation in a first heating mode in the gas injection type heat management system for a vehicle according to an embodiment of the present invention.
Figure 3B:
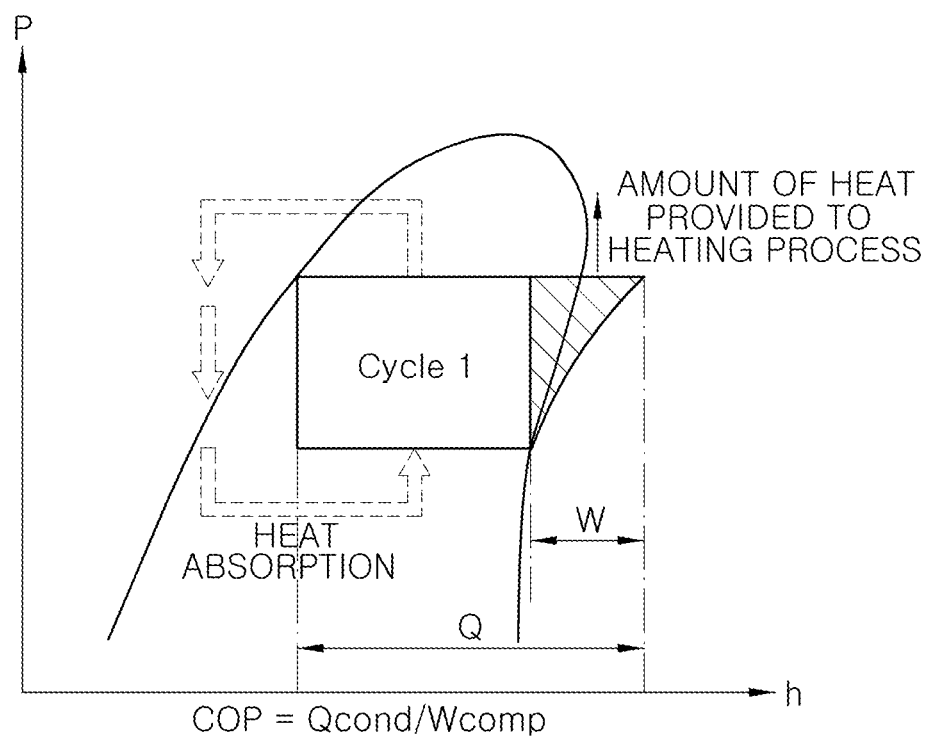
FIG. 3B is a P-h diagram illustrating the operation in the first heating mode in the gas injection type heat management system for a vehicle according to an embodiment of the present invention.

FIG. 3A is a circuit diagram illustrating an operation in a first heating mode in the gas injection type heat management system for a vehicle according to an embodiment of the present invention, and FIG. 3B is a P-h diagram illustrating the operation in the first heating mode in the gas injection type heat management system for a vehicle according to an embodiment of the present invention.

As illustrated in FIGS. 3A and 3B, the first heating mode is a heating mode in which a state of COP=1 is implemented such that the refrigerant flowing in the first refrigerant line 1, the third refrigerant line 3, and the fourth refrigerant line 4 does not exchange heat with a separate coolant, and the refrigerant flowing in the third refrigerant line 3 exchanges heat with the refrigerant flowing in the fourth refrigerant line 4.

In the first heating mode, in the heat absorber 70, the refrigerant, which is discharged from the flash tank 60 and is to be introduced into the compressor 10, absorbs the heat from the refrigerant discharged from the inner condenser 20.

To this end, the refrigerant flows to the first refrigerant line 1 and then circulates back to the first refrigerant line 1 through the third refrigerant line 3, and the flow of the refrigerant to the second refrigerant line 2 is blocked.

In particular, the refrigerant flowing to the first refrigerant line 1 flows to the fourth refrigerant line 4, such that the heat exchange is performed between the refrigerants in the heat absorber 70.

Therefore, the control unit operates the compressor 10 so that the compressed refrigerant radiates heat while exchanging heat with the air inside the vehicle while passing through the inner condenser 20.

Further, the control unit adjusts the opening degree of the first expansion valve 31 to expand the refrigerant passing through the first expansion valve 31. In addition, the second expansion valve 32 is fully closed, such that the flow of the refrigerant to the second refrigerant line 2 is blocked.

In addition, the control unit controls the operation of opening or closing the 3-way valve 80 so that the refrigerant, which radiates heat while passing through the inner condenser 20, flows to the heat absorber 70, such that the refrigerant flows to the fourth refrigerant line 4.

Therefore, the refrigerant compressed by the compressor 10 radiates heat while exchanging heat with the air inside the vehicle while passing through the inner condenser 20, such that the refrigerant is cooled. In this manner, the low-temperature, high-pressure refrigerant flows to the heat absorber 70 through the fourth refrigerant line 4.

Further, in the heat absorber 70, the heat exchange is performed between the low-temperature, high-pressure refrigerant discharged from the inner condenser 20 and the low-temperature, low-pressure refrigerant passing through the first expansion valve 31 and the flash tank 60. In this case, since the low-temperature, low-pressure refrigerant passing through the first expansion valve 31 and the flash tank 60 has a relatively lower temperature than the low-temperature, high-pressure refrigerant discharged from the inner condenser 20, the heat exchange is performed such that the low-temperature, low-pressure refrigerant passing through the first expansion valve 31 and the flash tank 60 absorbs the heat from the low-temperature, high-pressure refrigerant discharged from the inner condenser 20.

The high-temperature, low-pressure refrigerant, which exchanges heat in the heat absorber 70, is introduced into and compressed by the compressor 10.

Since the heating process is performed using heat exchange energy between the refrigerants, the state of COP=1 may be implemented in which the heating process may be performed only by the energy consumed by the compressor without heat exchange with a separate coolant.

Figure 4A:
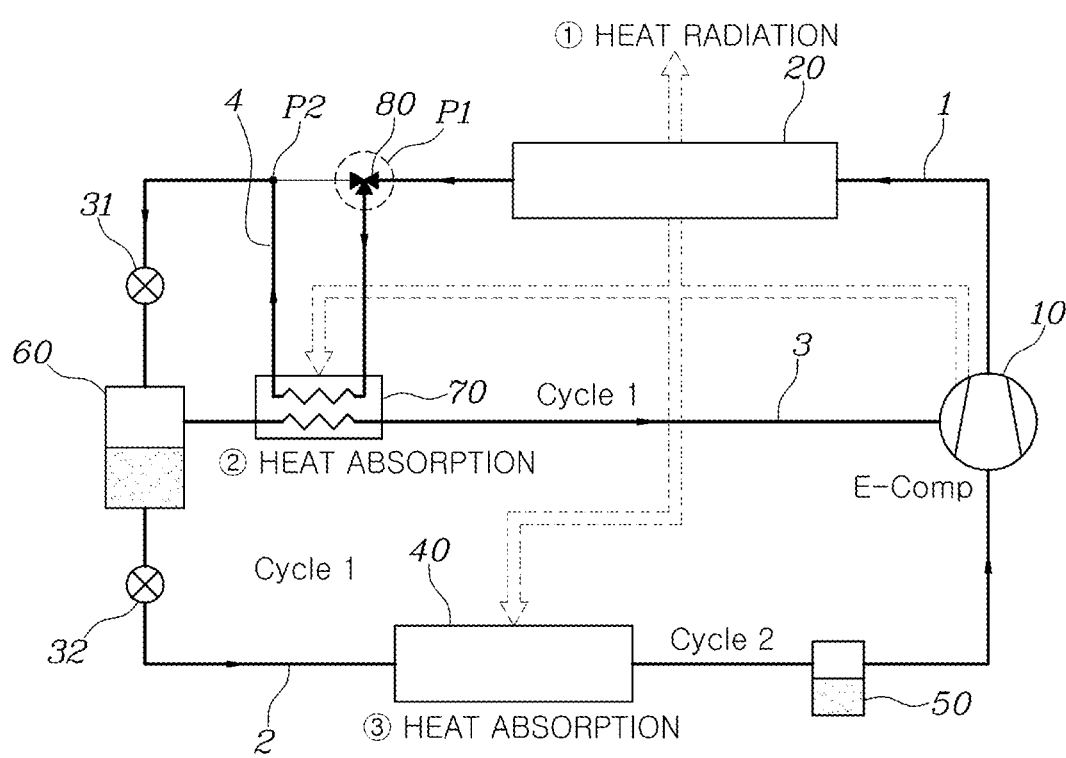
FIG. 4A is a circuit diagram illustrating an operation in a second heating mode in the gas injection type heat management system for a vehicle according to an embodiment of the present invention.
Figure 4B:
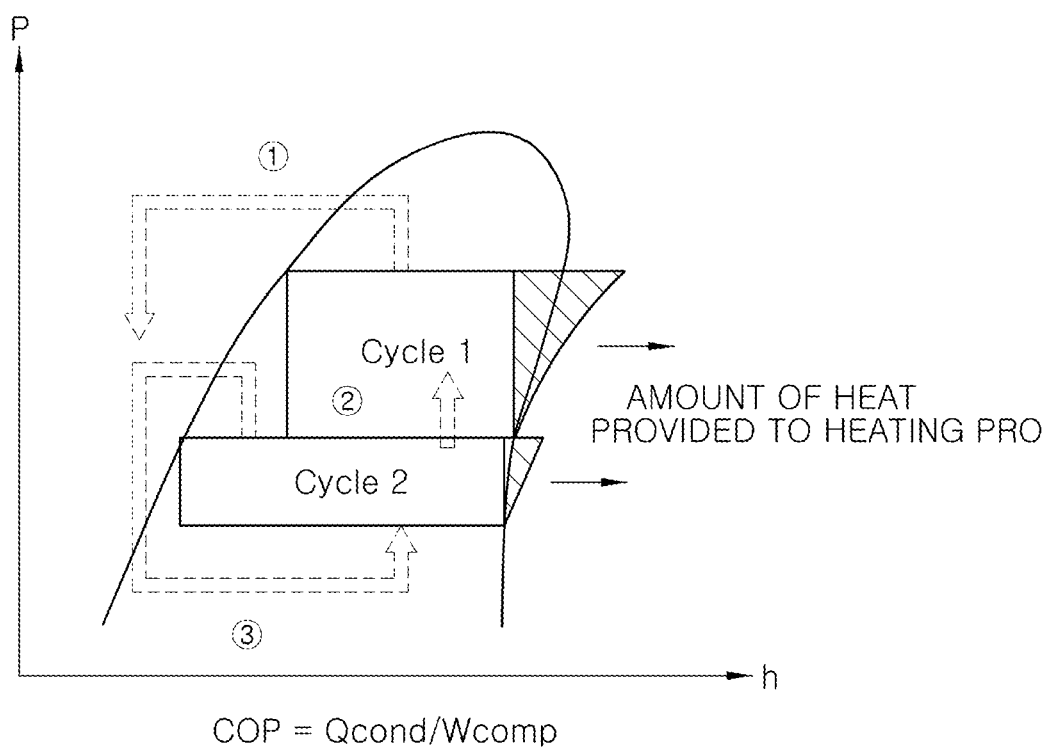
FIG. 4B is a P-h diagram illustrating the operation in the second heating mode in the gas injection type heat management system for a vehicle according to an embodiment of the present invention.

Next, FIG. 4A is a circuit diagram illustrating an operation in a second heating mode in the gas injection type heat management system for a vehicle according to an embodiment of the present invention, and FIG. 4B is a P-h diagram illustrating the operation in the second heating mode in the gas injection type heat management system for a vehicle according to an embodiment of the present invention.

As illustrated in FIGS. 4A and 4B, the second heating mode is a heating mode in which the state of COP=1 is implemented such that the refrigerant flowing in the first refrigerant line 1, the second refrigerant line 2, the third refrigerant line 3, and the fourth refrigerant line 4 does not exchange heat with a separate coolant, and the refrigerant flowing in the third refrigerant line 3 exchanges heat with the refrigerant flowing in the fourth refrigerant line 4. In the second heating mode, the heat exchange is performed between the refrigerant passing through the evaporator 40 and the air circulating in the vehicle, which makes it possible to further improve the heat pump efficiency and adjust the amount of moisture in the interior.

In the second heating mode, the refrigerant flowing in the second refrigerant line 2 absorbs, in the evaporator 40, the heat from the air circulating in the vehicle, and the refrigerant, which is discharged from the flash tank 60 and introduced into the compressor 10, absorbs, in the heat absorber 70, the heat from the refrigerant discharged from the inner condenser 20.

To this end, the refrigerant flows to the first refrigerant line 1, a part of the refrigerant circulates back to the first refrigerant line 1 through the second refrigerant line 2, and the remaining part of the refrigerant circulates to the third refrigerant line 3. In particular, like the first heating mode, the refrigerant flowing to the first refrigerant line 1 flows to the fourth refrigerant line 4, such that the heat exchange is performed between the refrigerants in the heat absorber 70.

Therefore, the control unit operates the compressor 10 so that the compressed refrigerant radiates heat while exchanging heat with the air inside the vehicle while passing through the inner condenser 20.

Further, the control unit adjusts the opening degree of the first expansion valve 31 to expand the refrigerant passing through the first expansion valve 31. In addition, like the first expansion valve 31, the opening degree of the second expansion valve 32 may be adjusted to expand the refrigerant passing through the second expansion valve 32 or the second expansion valve 32 may be fully opened to allow the refrigerant to flow without being additionally expanded.

In addition, the control unit controls the operation of opening or closing the 3-way valve 80 so that the refrigerant, which radiates heat while passing through the inner condenser 20, flows to the heat absorber 70, such that the refrigerant flows to the fourth refrigerant line 4.

Therefore, the refrigerant compressed by the compressor 10 radiates heat while exchanging heat with the air inside the vehicle while passing through the inner condenser 20, such that the refrigerant is cooled. In this manner, the low-temperature, high-pressure refrigerant flows to the heat absorber 70 through the fourth refrigerant line 4.

Further, in the heat absorber 70, the heat exchange is performed between the low-temperature, high-pressure refrigerant discharged from the inner condenser 20 and the low-temperature, low-pressure refrigerant passing through the first expansion valve 31 and the flash tank 60. In this case, since the low-temperature, low-pressure refrigerant passing through the first expansion valve 31 and the flash tank 60 has a relatively lower temperature than the low-temperature, high-pressure refrigerant discharged from the inner condenser 20, the heat exchange is performed such that the low-temperature, low-pressure refrigerant passing through the first expansion valve 31 and the flash tank 60 absorbs the heat from the low-temperature, high-pressure refrigerant discharged from the inner condenser 20.

The refrigerant, which radiates heat in the heat absorber as described above, is introduced back into the first refrigerant line 1 and introduced into and expanded by the first expansion valve 31.

In addition, the low-temperature, low-pressure refrigerant flowing to the second refrigerant line 2 absorbs heat while passing through the evaporator 40 and becomes the high-temperature, low-pressure refrigerant, and the high-temperature, low-pressure refrigerant is introduced into and expanded by the compressor 10 together with the high-temperature, low-pressure refrigerant passing through the heat absorber 70.

Since the heating process may be performed by heat exchange energy between the refrigerants, it is possible to implement the state of COP=1 in which the heating process is performed only by the energy consumed by the compressor without heat exchange with a separate coolant. The heating process is performed by the evaporator 40 absorbing the heat from the ambient air, which makes it possible to further improve the heat pump efficiency and adjust the amount of moisture in the interior.

Meanwhile, the control unit according to an exemplary embodiment of the present invention may be implemented by a non-volatile memory (not illustrated) configured to store algorithm(s) for controlling operations of various constituent elements in a vehicle or store data related to software commands for executing the algorithm(s), and by a processor (not illustrated) configured to perform the following operations by using the data stored in the corresponding memory. In this case, the memory and the processor may be implemented as separate chips. Alternatively, the memory and the processor may be implemented as a single chip in which the memory and the processor are integrated. The processor may be configured in the form of one or more processors.

While the present invention has been described with reference to the accompanying drawings and the aforementioned exemplary embodiments, the present invention is not limited thereto but is defined by the appended claims. Therefore, those skilled in the art can variously change and modify the present invention without departing from the technical spirit of the appended claims.

What is claimed is:

1. A gas injection-type heat management system, the system comprising:
    a first refrigerant line along which a compressor, an inner condenser, a first expansion valve, and a flash tank are sequentially provided and configured such that a refrigerant flows therethrough;
    a second refrigerant line along which a second expansion valve and an evaporator are sequentially provided and configured such that the refrigerant flows from the flash tank and circulates to the compressor via the second expansion valve and the evaporator;
    a third refrigerant line configured such that the refrigerant discharged from the flash tank flows directly to the compressor and a heat absorber configured to perform heat exchange between the refrigerant discharged from the inner condenser and the refrigerant discharged from the flash tank; and
    a controller configured to control whether to operate the compressor and to control whether to allow the refrigerant to flow and to control whether to expand the refrigerant by adjusting opening degrees of the first expansion valve and the second expansion valve.

2. The system of claim 1, further comprising a fourth refrigerant line that branches off from the first refrigerant line at a branch point provided at a downstream point of the inner condenser based on a flow direction of the refrigerant.

3. The system of claim 2, wherein:
    the fourth refrigerant line passes through the heat absorber and then merges into the first refrigerant line at a junction between the first expansion valve and a downstream point of the branch point; and
    a three-way valve configured to control flows in three directions is provided at the branch point.

4. The system of claim 2, wherein:
    the fourth refrigerant line passes through the heat absorber and then merges into the first refrigerant line at a junction between the first expansion valve and a downstream point of the branch point; and
    a three-way valve configured to control flows in three directions is provided at the junction.

5. The system of claim 1, wherein the system is configured to perform heat exchange in the heat absorber such that the refrigerant discharged from the flash tank absorbs heat from the refrigerant discharged from the inner condenser.

6. The system of claim 1, wherein the system is configured to perform heat exchange in the evaporator such that the refrigerant flowing in the second refrigerant line absorbs heat from air circulating in a vehicle.

7. A gas injection-type heat management system, the system comprising:
    a first refrigerant line along which a compressor, an inner condenser, a first expansion valve, and a flash tank are sequentially provided and configured such that a refrigerant flows therethrough;

a second refrigerant line along which a second expansion valve and an evaporator are sequentially provided and configured such that the refrigerant flows from the flash tank and circulates to the compressor via the second expansion valve and the evaporator;

a third refrigerant line configured such that the refrigerant discharged from the flash tank flows directly to the compressor and a heat absorber configured to perform heat exchange between the refrigerant discharged from the inner condenser and the refrigerant discharged from the flash tank;

a fourth refrigerant line that branches off from the first refrigerant line at a branch point provided at a downstream point of the inner condenser based on a flow direction of the refrigerant, wherein the fourth refrigerant line passes through the heat absorber and then merges into the first refrigerant line at a junction between the first expansion valve and a downstream point of the branch point;

a three-way valve provided at the branch point or at the junction and configured to control flows in three directions; and a controller configured to control whether to operate the compressor and to control whether to allow the refrigerant to flow and to control whether to expand the refrigerant by adjusting opening degrees of the first expansion valve and the second expansion valve; and wherein in a first heating mode, the controller is configured to circulate the refrigerant flowing to the first refrigerant line to the third refrigerant line, block the flow of the refrigerant to the second refrigerant line, and allow the refrigerant passing through the inner condenser to flow to the heat absorber, such that the refrigerant, which is discharged from the flash tank and introduced into the compressor, absorbs, in the heat absorber, heat from the refrigerant discharged from the inner condenser.

8. The system of claim 7, wherein in the first heating mode, the controller is configured to operate the compressor so that the compressed refrigerant radiates heat while exchanging heat with air inside a vehicle while passing through the inner condenser.

9. The system of claim 8, wherein in the first heating mode, the controller is configured to allow the refrigerant to flow to the fourth refrigerant line by controlling an operation of opening or closing the three-way valve so that the refrigerant, which radiates heat while passing through the inner condenser, flows to the heat absorber.

10. The system of claim 9, wherein in the first heating mode, the controller is configured to adjust an opening degree of the first expansion valve so that the refrigerant that radiates heat while passing through the inner condenser and the refrigerant that radiates heat while passing through the heat absorber are expanded by passing through the first expansion valve and then pass through the flash tank, and the controller is configured to fully close the second expansion valve to block the flow of the refrigerant to the second refrigerant line.

11. The system of claim 7, wherein the first heating mode is a state of COP=1 in which the refrigerant flowing in the first refrigerant line, the third refrigerant line, and the fourth refrigerant line does not exchange heat with a separate coolant, and heat exchange is performed between the refrigerant flowing in the third refrigerant line and the refrigerant flowing in the fourth refrigerant line.

12. The system of claim 7, wherein in a second heating mode, the controller is configured to circulate a part of the refrigerant flowing to the first refrigerant line to the second refrigerant line, circulate a remaining part of the refrigerant to the third refrigerant line, and allow the refrigerant passing through the inner condenser to flow to the heat absorber.

13. The system of claim 12, wherein in the second heating mode, the system is configured such that the refrigerant flowing in the second refrigerant line absorbs, in the evaporator, heat from air circulating in a vehicle, and wherein the refrigerant discharged from the flash tank and introduced into the compressor absorbs, in the heat absorber, heat from the refrigerant discharged from the inner condenser.

14. The system of claim 13, wherein in the second heating mode, the controller is configured to:
operate the compressor so that the compressed refrigerant radiates heat while exchanging heat with the air in the vehicle while passing through the inner condenser;
allow the refrigerant to flow to the fourth refrigerant line by controlling an operation of opening or closing the three-way valve so that the refrigerant that radiates heat while passing through the inner condenser flows to the heat absorber;
adjust an opening degree of the first expansion valve so that the refrigerant that radiates heat while passing through the inner condenser and the refrigerant that radiates heat while passing through the heat absorber are expanded while passing through the first expansion valve and then pass through the flash tank; and
adjust an opening degree of the second expansion valve so that a part of the refrigerant passing through the flash tank is expanded by passing through the second expansion valve and then passes through the evaporator.

15. The system of claim 13, wherein:
the second heating mode is a state of COP=1 in which the refrigerant flowing in the first refrigerant line, the second refrigerant line, the third refrigerant line, and the fourth refrigerant line does not exchange heat with a separate coolant, and heat exchange is performed between the refrigerant flowing in the third refrigerant line and the refrigerant flowing in the fourth refrigerant line; and
the second heating mode is a state in which heat exchange is performed between the refrigerant passing through the evaporator and the air circulating in the vehicle.

\* \* \* \* \*